J. LUNDGREN.
BALANCING MACHINE.
APPLICATION FILED JUNE 4, 1918.
1,398,333.
Patented Nov. 29, 1921.
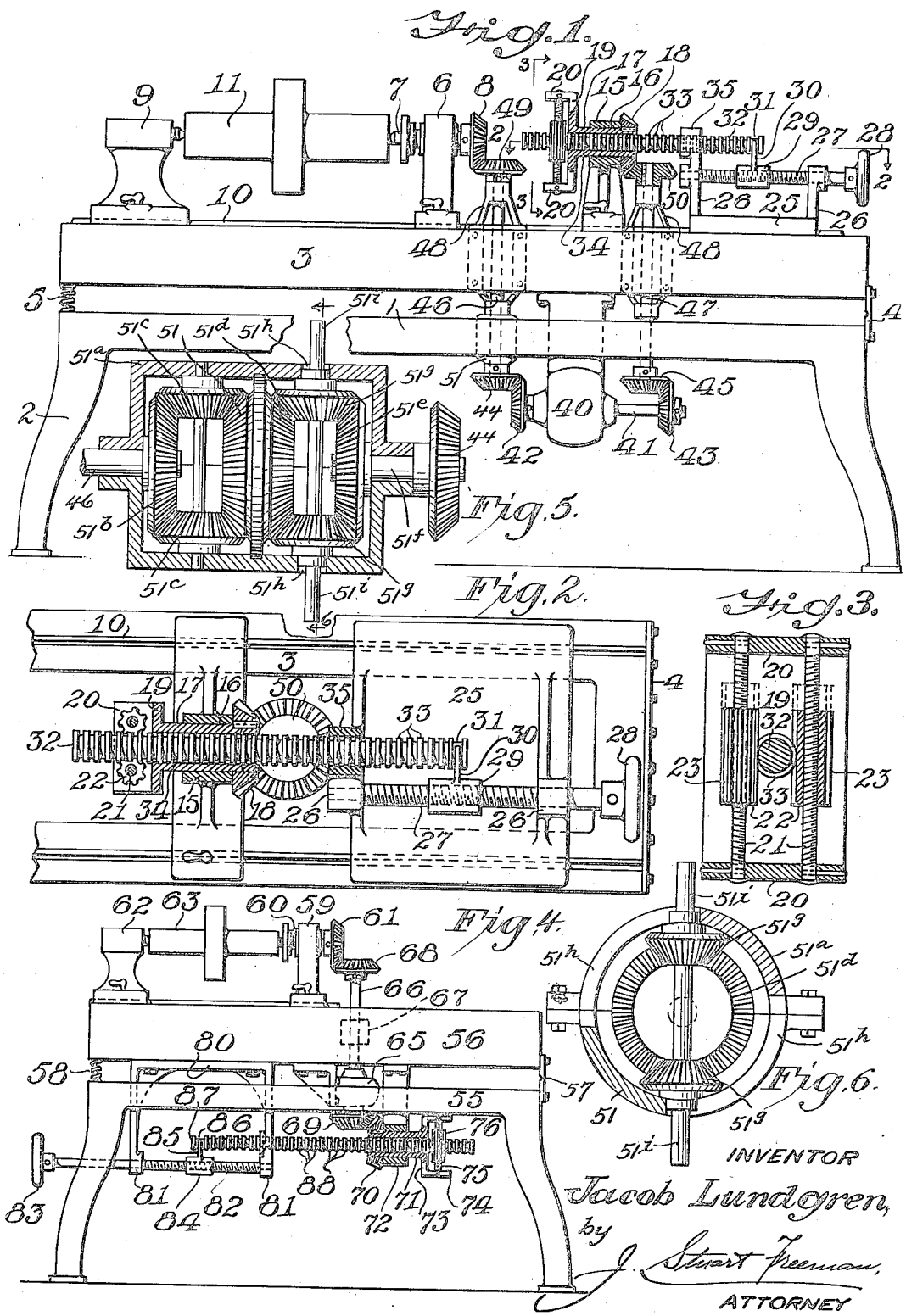
INVENTOR
Jacob Lundgren,
by J. Stuart Freeman,
ATTORNEY

UNITED STATES PATENT OFFICE.

JACOB LUNDGREN, OF PHILADELPHIA, PENNSYLVANIA, ASSIGNOR TO CARLSON-WENSTROM CO., A CORPORATION OF DELAWARE.

BALANCING-MACHINE.

1,398,333.  Specification of Letters Patent.  Patented Nov. 29, 1921.

Application filed June 4, 1918. Serial No. 238,139.

*To all whom it may concern:*

Be it known that I, JACOB LUNDGREN, a citizen of the United States, residing at Philadelphia, in the county of Philadelphia and State of Pennsylvania, have invented certain new and useful Improvements in Balancing-Machines, of which the following is a specification.

The object of this invention is to provide an improved balancing mechanism for accurately and carefully balancing a rotatable body statically while said body is rotating.

More particularly, the improved mechanism comprises one or more weights adapted to be revolved in unison with a body being balanced, and means to shift said weight or weights in a plane perpendicular to their axis of rotation while said body and said weights are in motion, and either upon coincident axes, or upon axes lying in the same plane upon a support adapted to oscillate about an axis perpendicular to said first plane.

A still further object is to provide a static balancing machine comprising a pair of weights revoluble in unison with a body to be tested, and means to adjust the position of said weights while the same are in motion, said adjustment to be so arranged as to be equivalent to shifting a single weight radially with respect to its axis of rotation.

With these and still further objects in view, the invention comprises certain details of construction and operation hereinafter fully described, when read in conjunction with the accompanying drawings, in which Figure 1 is a front elevation of a machine comprising one form in which the invention may be embodied; Fig. 2 is a section on the line 2—2 of Fig. 1; Fig. 3 is an enlarged detail view of a pair of balancing weights and the rotatable support therefor; Fig. 4 is a front elevation of a slightly modified embodiment of the invention; Fig. 5 is a longitudinal diametrical section through a suitable form of differential mechanism; and Fig. 6 is a transverse section on the line 6—6 of Fig. 5.

Referring to the drawings, a base member 1 is provided with suitable legs or supports 2, while an oscillatory member 3 is yieldingly connected at one end to said base member by means of a resilient hinge member 4, and at its other end being yieldingly spaced from said base member by means of one or more coil-springs 5.

Mounted upon the member 3 is a head-slot 6 supporting a live spindle 7, on the same axis with which is a bevel gear 8. An adjustable tail-stock 9 is movably positioned upon a suitable track 10, carried by the under surface of the member 3, while between said live spindle and tail-stock is adapted to be revolubly mounted a body 11, which is to be tested for its degree or condition of static balance.

Also positioned upon and secured to the upper surface of the oscillatory member 3 is a support 15, through a bore 16 in which is revolubly mounted a cylinder 17, to one end of which is keyed a bevel-gear 18, and the other end of which is directed radially outwardly, and thence in parallel directions to form a plate 19, having oppositely positioned parallel extensions 20, between and secured to which extend two preferably parallel rods 21, respectively provided with right and left hand threads, and each of which carries an elongated weight member 22, provided with an axial threaded bore adapted to coöperate with the threads of the adjacent one of said rods 21 and with a toothed outer surface 23 for a purpose hereinafter described.

Still further mounted upon the oscillatory member 3 is a bracket 25 provided with upwardly extending arms 26, through which extends and is revolubly mounted a threaded rod 27, to which at one end is secured a hand-wheel 28 for the purpose of manually revolving said rod. An internally threaded sleeve 29 is mounted upon the rod 27, and by coöperation with the threads of the latter is adapted to progress from one side to the other as may be desired, said sleeve being provided with a suitable extension comprising, as for instance, a pair of spaced fingers 30 which slidably coöperate with the sides of a groove 31 in a bar 32, which is provided throughout its extent with peripherally extending, regularly spaced, gear-teeth 33, said rod being longitudinally slidable through an axially positioned bore 34 in the cylinder 17, and the teeth 33 being adapted to coöperate with the teeth of, and thereby to revolve, both of the weight members 22 simultaneously and to exactly the same extent.

An auxiliary support or bearing for the rod 32 may be provided by extending at least one of the arms 26 upwardly to form a hollow bearing portion 35. Secured to and suspended from, the under surface of the oscillatory members 3, is a suitable electric or other motor 40, having a shaft 41, provided with bevel-gears 42 and 43, meshing respectively with similar gears 44 and 45 secured to vertically extending shafts 46 and 47, the gear 44 being connected to the shaft 46 through a differential mechanism hereinafter described, said shafts being supported by suitable brackets 48 also secured to the member 3, and the upper ends of said shaft being respectively provided with bevel-gears 49 and 50, which in turn mesh and revolve in unison with the bevel-gears 8 and 18 hereinbefore referred to.

The shaft 46, instead of being continuous, may be provided with any form of differential mechanism 51, with means to adjust the the same while said shaft is revolving, said so-called differential mechanism being any arrangement for the purpose of altering the angular relationship between the shaft 7, with the body to be tested which is carried thereby, and the cylinder 17 which carries the balancing weight members 22, such alteration being accomplished equally well, whether the mechanism embodying the shaft 46 is revolving, or is stationary. Another condition which has been found preferable to insure efficient operation is that the axis of rotation of the body being tested, which axis is defined by the position of the shaft 7, shall be in axial alinement with the axis of rotation of the cylinder 17, which is positioned by the support 15.

A suitable form of the differential mechanism 51 is shown in Figs. 5 and 6, wherein the shaft 46 extends into a halved casing $51^a$ and carries a bevel gear $51^b$, connected by one or a pair of idlers $51^c$ upon a shaft extending transversely with respect to said shaft 46, to revolve in unison with, in the opposite direction, a double-faced bevel gear $51^d$ revoluble upon an axis coincident with that of the shaft 46. The bevel gear $51^e$ upon a shaft $51^f$, also having an axis coincident with that of the shaft 46, is connected by means of one or a pair of idlers $51^g$ to revolve in unison with but in a direction opposite to the gear $51^d$, so that the gears $51^e$ and $51^b$ revolve in the same direction. The gears $51^g$ are mounted upon a shaft $51^i$, which project radially through one or a pair of slots $51^h$ in and extending around a quarter of the circumference of the casing $51^a$.

With such a construction the shafts 46 and $51^f$, upon which latter the bevel gear 44 is directly mounted, revolve in the same direction and in perfect unison, but just as soon as the shaft $51^i$ is manually moved in either direction, the angular position of the gear 44 is shifted with respect to the shaft 46, and consequently the angular relation of the plate 19 with respect to the body 11 being balanced is altered. No more than a quadrant is required for the extent of the slots $51^h$, as even with this limit of movement the gear $51^e$ can be shifted 180 degrees with respect to the gear $51^d$, and for balancing a body in the other half of a circumference the weights can be shifted toward the opposite ends of the rods 21.

In the operation of this device, the weight members 22 are positioned neutrally, as represented by Figs. 1 and 3, and a body to be tested is supported in the device as is also shown, the motor started running and its speed increased gradually until such a speed is reached at which, if there is a lack of static balance in the body 11, the oscillatory member 3 will commence to vibrate with respect to the base member 1 by virtue of the hinge and spring connections 4 and 5 extending between them. While the parts of the device continue to rotate, the hand-wheel is adjusted in clockwise and counter-clockwise directions, thus longitudinally shifting the position of the peripherally toothed rod 32, and uniformly shifting in parallel paths the weight members 22, thereby disturbing the neutral position of said last-named members and destroying the static balance of the balancing portion of the apparatus.

A position will probably be found at which the vibration of the member 3 is brought to a minimum, after which, and in fact even if not found, the differential mechanism 51 is then so adjusted as to alter to any desired degree the angular relationship between the body being tested and the balancing mechanism. The adjustment of the weight members 22 is then again proceeded with until such displacement of the members 22 is found as will counteract all vibrating tendencies of an unbalanced body 11, after which the machine is stopped and material removed from, or added to, any convenient space upon said body 11, to the exact extent and in the position indicated by the displacement of said weight members together with the axial position of their supporting cylinder 17 with respect to the said member 11.

Proof that a positive correction for the previously existing lack of static balance has been attained can be had by again revolving the body thus tested and balanced, as shown in Fig. 1, with the balancing members in neutral positions, and while the system, thus formed by said balancing members and the balanced body, is being revolved, by adjusting the differential mechanism so that the axial relationship of said bodies hereinbefore referred to is altered through 180 degrees.

The arrangement of the mechanism, shown in Fig. 4, is simply for the purpose of illustrating a construction which will accomplish these results, but in which the axis of rotation of the body being tested is out of coincidence, yet parallel with, the axis of rotation of the balancing weights. A base 55 is provided with supporting legs, and upon the same is mounted an oscillatory member 56, spaced from said base but oscillatable with respect thereto by means of a yielding or pivotable hinge connection 57 and one or more coil-springs 58. Mounted upon the member 56 is a head-stock 59 revolubly supporting a live spindle 60, which in turn has secured thereto a bevel-gear 61, said oscillatory member also having adjustably supported thereupon a tail-stock 62 by which, together with said live spindle, is revolubly mounted a body 63 to be tested.

A suitable motor 65 is also carried by the oscillatory member 56 and is provided with a shaft 66, which may be broken by any suitable differential mechanism 67, said shaft being provided at one end with a bevel-gear 68 meshing with a similar gear 61, and at its opposite end with a bevel-gear 69, meshing with a similar gear 70, carried by a cylinder 71 revolubly supported by a bracket 72 carried by the member 56, said cylinder being also provided at its end opposite to the gear 70 with a plate 73 provided with oppositely extending parallel arms 74, between which latter extend a pair of right and left hand threaded rods 75, carrying adjustable balancing members 76 exactly similar to those hereinbefore described.

Carried by, and preferably extending from, the member 56 is a bracket 80 provided with parallel arms 81 which rotatably support a threaded rod 82, carrying upon one end a hand-wheel 83, while in engagement with the threaded portion of said rod a sleeve 84 is provided with spaced fingers 85, which in turn coöperate with the sides of a groove 86 in the bar 87, which is provided throughout the greater portion of all of its extent with peripherally extending teeth 88, and is longitudinally slidably supported by at least one of said arms 81. Said bar 87 extends slidably through an axially positioned bore within the cylinder 71, and its teeth coöperate with the teeth of the balancing weight members 76, so that, by adjusting the sleeve 84 on actuating the hand-wheel 83, the bar 87 is shifted in one direction or the other, thus actuating both of the weight members 76 and to the exact same extent to one side or the other of their common axis of rotation.

Thus, when the member to be balanced is operatively supported by the mechanism and the motor 65 is running and driving the said member to be balanced and the balancing weight members in synchronism, said weight members may be so adjusted as to minimize any lack of static balance which may exist within the body being tested, and which balance will be indicated by the oscillation of the member 55. Also, as in the case previously described, if this adjustment does not fully accomplish the desired result, a further lessening of the vibration of said member 56 and the apparatus which it carries may be attained, and in fact a complete arrest of all vibratory motion may be thus secured, by so adjusting the differential mechanism 67 to alter the angular relation between the body being tested and the balancing weights, as to make the adjustment of the weights of the greatest utility. A body thus balanced with this second embodiment of the invention may be corrected for its previous lack of static balance, and its balanced condition proved exactly as hereinbefore described in connection with the first embodiment of the invention.

Having thus described my invention, what I claim and desire to protect by Letters Patent of the United States is:—

1. A balancing machine, comprising a support for a body to be tested, a pair of weights connected to be revolved in unison and adjustable simultaneously in the same direction along parallel paths located upon opposite sides of, and in a plane at right angles to their common axis of rotation, and means to revolve a body upon said support and said weights in synchronism.

2. A balancing machine, comprising a support for a body to be tested, a pair of weights connected to be revolved in unison and adjustable along paths in a plane at right angles to their common axis of rotation, means to adjust said weights while they are in motion, and means to revolve a body upon said support and said weights in synchronism.

3. A balancing machine, comprising a support for a body to be tested, a pair of weights connected to be revolved in unison and adjustable along paths in a plane at right angles to their common axis of rotation, means to alter the angular relation of said weights with respect to the body being tested, while said weights and said body are in motion, and means to revolve a body upon said support and said weights in synchronism.

4. A balancing machine, comprising a support for a body to be tested, a pair of weights connected to be revolved in unison and adjustable along paths in a plane at right angles to their common axis of rotation, means to adjust said weights while they are in motion, means to alter the angular relation of said weights with respect to the body being tested, while said weights and said body are in motion, and means to revolve a body upon said support and said weights in synchronism.

5. A balancing machine, comprising a support for a body to be tested, a pair of weights adjustable upon parallel axes in a plane perpendicular to their common axis or rotation, and means to revolve a body upon said support and said weights in synchronism.

6. A balancing machine, comprising a support for a body to be tested, a pair of weights adjustable upon parallel axes in a plane perpendicular to their common axis of rotation, means to alter the angular relation of said weights with respect to the body being tested, while said weights and said body are in motion, and means to revolve a body upon said support and said weights in synchronism.

7. A balancing machine, comprising a support for a body to be tested, a pair of weights adjustable upon parallel axes in a plane perpendicular to their common axis of rotation, means to adjust said weights in the same direction to be the equivalent of shifting a single weight radially from their common axis of rotation, and means to revolve a body upon said support and said weights in synchronism.

8. A balancing machine, comprising a support for a body to be tested, a pair of weights adjustable upon parallel axes in a plane perpendicular to their common axis of rotation, means to alter the angular relation of said weights with respect to the body being tested, while said weights and said body are in motion, means to adjust said weights in the same direction to be the equivalent of shifting a single weight radially from their common axis of rotation, and means to revolve a body upon said support and said weights in synchronism.

9. A balancing machine, comprising a pair of weights, means to support said weights to revolve about a common axis, and means to adjust said weights tangentially with respect to their axis of rotation to effect a result equivalent to the movement of a single weight radially toward and away from its axis of rotation.

10. A balancing machine, comprising a pair of weights revoluble about a common axis and adjustable away from said axis to effect a result equivalent to the movement of a single weight radially from coincidence with their axis of rotation, and means to adjust said weights while the same are revolving.

11. A balancing machine, comprising a support, means for rotatably supporting a body thereon to be tested, balancing means revoluble with the body to create a centrifugal force in opposition to a centrifugal force caused by the rotation of the body, power transmitting means connecting said supporting means and said balancing means to normally rotate in synchronism, and differential means to alter the angular relation, about their axes, of the body with respect to said balancing means while the two are revolving, the axis of rotation of said body and of said first means being in alinement.

12. A balancing machine, comprising a support for a body to be balanced, and a pair of weights, means to revolve said weights about a common axis in synchronism with said support and a body carried thereby, means to adjust said weights in the same direction tangentially of their common axis of rotation along parallel paths, to effect a result equivalent to the movement of a single weight radially with respect to said axis, and means to adjust the paths of movement of said weights angularly about their common axis of rotation and with respect to said support and a body carried thereby, while said weights are revolving about said axis of rotation.

13. A balancing machine, comprising a yieldingly mounted stock, a spindle journaled in the said stock, and having means for supporting the work, a movable weight, and devices selectively engaged while in motion, one of the said devices controlling the amount of eccentricity of the said movable weight with respect to the center of rotation of the work, and the other device controlling the angular position of the said movable weight with respect to the center of rotation of the work.

In testimony whereof I have affixed my signature in the presence of two witnesses.

JACOB LUNDGREN.

Witnesses:
J. STUART FREEMAN,
MERRILL I. CRANMER.